United States Patent [19]

Monroe et al.

[11] Patent Number: 5,407,391
[45] Date of Patent: Apr. 18, 1995

[54] NEGATIVE BUST ILLUSION AND RELATED METHOD

[75] Inventors: Marshall M. Monroe, Glendale; William G. Redmann, Simi Valley, both of Calif.

[73] Assignee: The Walt Disney Company, Burbank, Calif.

[21] Appl. No.: 62,305

[22] Filed: May 14, 1993

[51] Int. Cl.$^6$ ............................................. A63J 5/02
[52] U.S. Cl. ............................................. 472/61; 472/70
[58] Field of Search .............. 472/61, 63, 137, 70, 472/57

[56] References Cited

U.S. PATENT DOCUMENTS

| | | | |
|---|---|---|---|
| 916,105 | 3/1909 | Clark | 472/61 |
| 2,222,084 | 11/1940 | Marx | 472/61 |
| 2,402,822 | 6/1946 | Kraft | 472/61 X |
| 3,823,500 | 7/1974 | Spitz | 40/219 |
| 4,094,501 | 6/1978 | Burnett | 472/61 X |
| 4,971,312 | 11/1990 | Weinreich | 472/61 X |
| 5,291,297 | 3/1994 | Steinmeyer | 472/61 |

Primary Examiner—Carl D. Friedman
Assistant Examiner—Beth A. Aubrey
Attorney, Agent, or Firm—Pretty, Schroeder, Brueggemann & Clark

[57] ABSTRACT

A negative bust illusion is formed of a surface (representing a negative of an object) that presents a concave side to viewers to generate an illusion that the object always gazes at viewers as they move within an enlarged field of view. The negative bust is analogous to a mold of the object, with its depth flattened to impart a wider effective range the illusion. The rigid shell has a cavity that defines the bust and is formed of a thin, translucent styrene material such that rear projection is readily imparted to the convex side for imparting animation to the gaze effect.

22 Claims, 3 Drawing Sheets

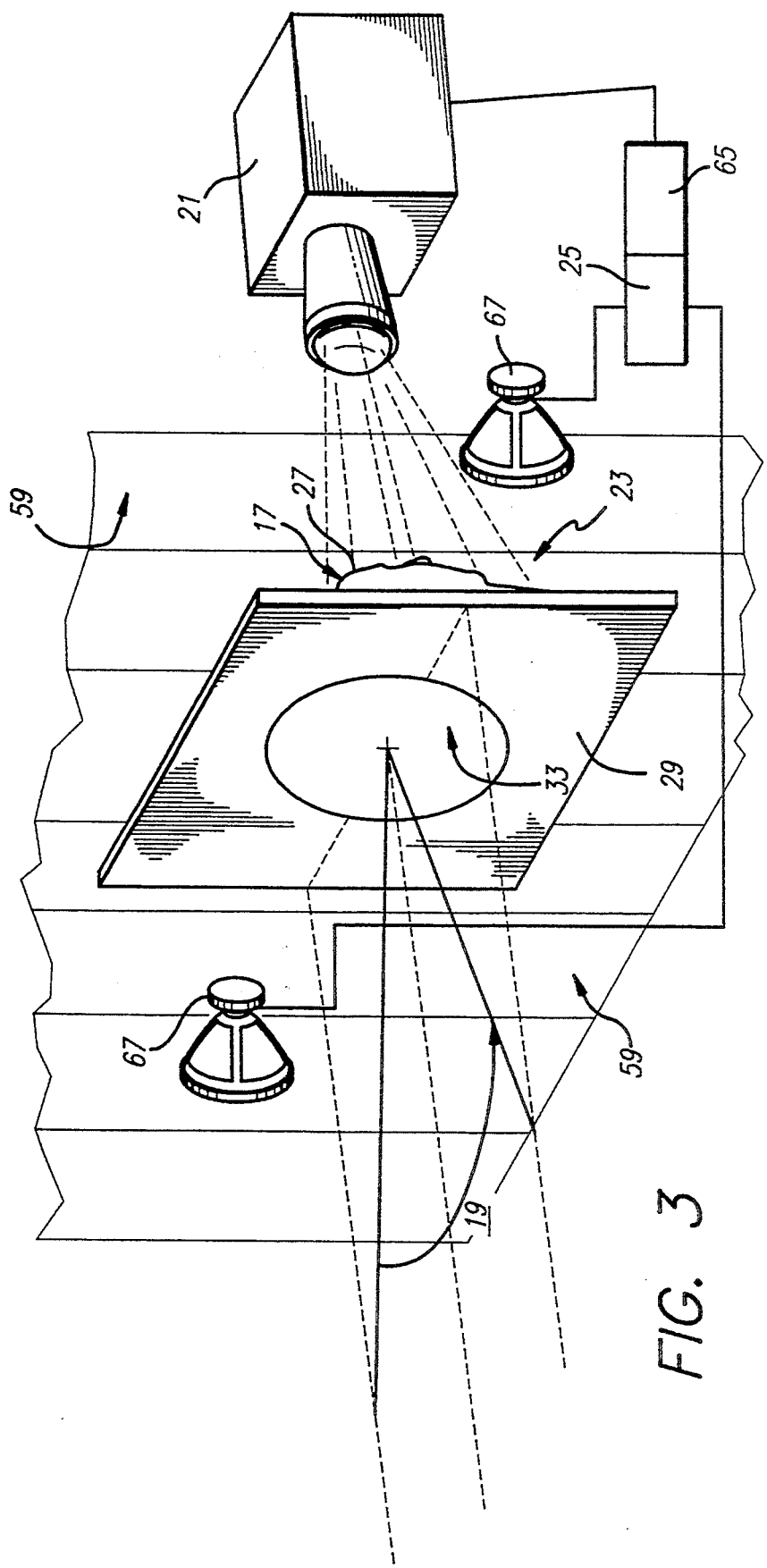

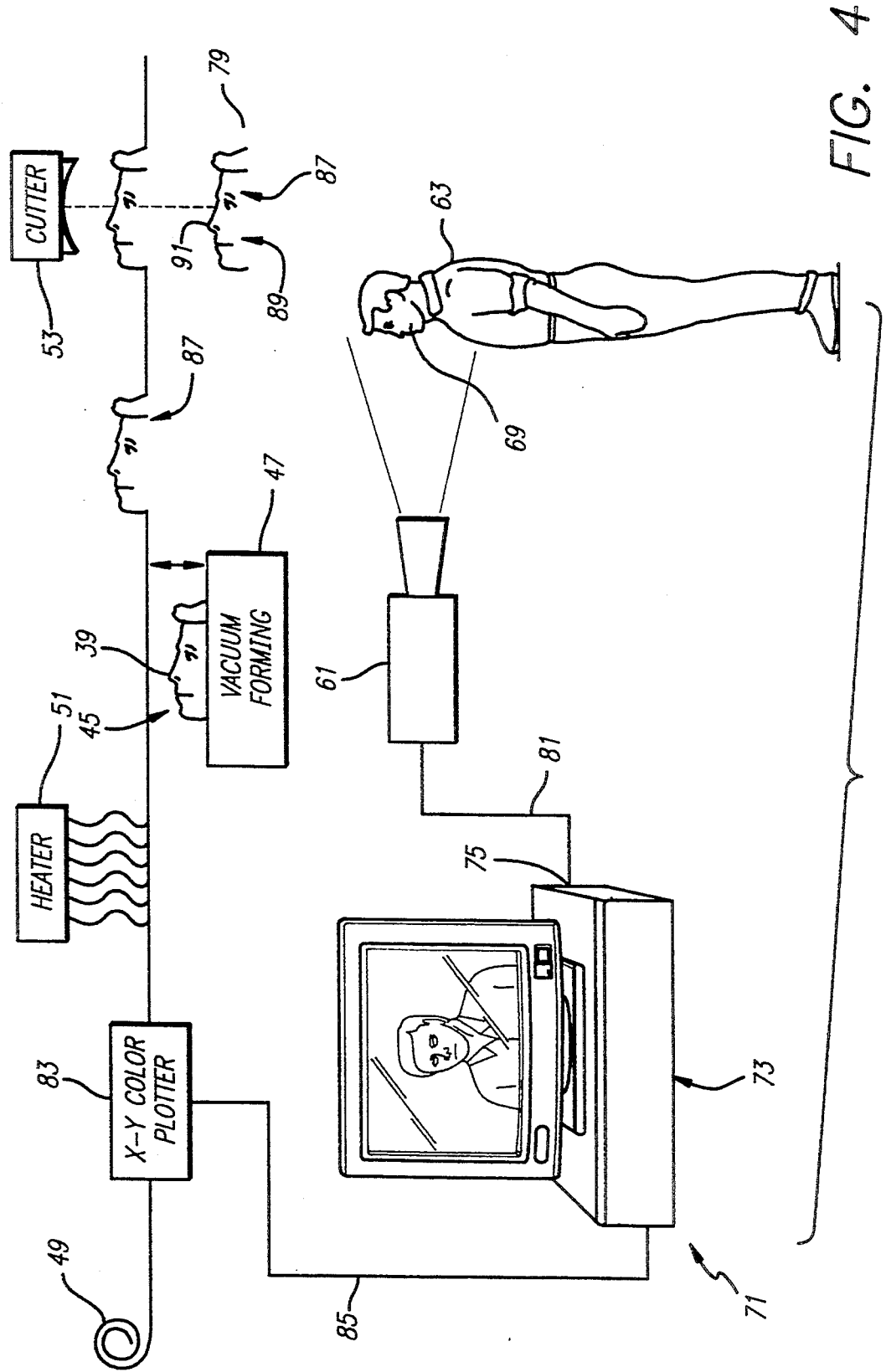

NEGATIVE BUST ILLUSION AND RELATED METHOD

This invention relates to a negative bust illusion, that is, a negative of a three-dimensional object, much like a mold, that is used to impart a visual impression that it is itself the three-dimensional object, and that the three-dimensional object continues to gaze upon a viewer who moves past it no matter where the viewer stands or moves within a field of view.

BACKGROUND

Since the times of early artists, people have endeavored to create realistic likenesses of themselves, others, and other three-dimensional objects, to thereby impart a sense of presence. Such artistic reproductions have generally taken two dimensional forms, for example, paintings, and also three-dimensional forms, including various types of sculptures. In general, the two dimensional reproductions are insufficient in reproducing three dimensional presence having a large field of view; visual cues such as depth, shading and perspective have historically been impossible to reproduce in two dimensions to create a three dimensional illusion other than for a discrete viewing point.

Sculptures, on the other hand, have proved generally better at visually imitating original objects, because of their dimensionality. To this end, artists have for a long time created busts and other three-dimensional representations of original objects to recreate presence of the original object.

One method of forming these dimensional recreations is to create a negative bust as a mold to recreate a three-dimensional depiction. As was noticed long ago, the negative bust itself can be used (with proper lighting) to create a three-dimensional impression and to convey presence. Typically, these negative busts are concave viewing surfaces having the same depth and features (typically facial) of the original three-dimensional object. They provide the illusion that the objects are represented by the negative bust, and have a gaze which follows a viewer wherever he or she goes within a narrow field of view.

For example, Disneyland TM in Anaheim, Calif. has long used such an effect in its HAUNTED MANSION TM attraction. In this environment, a negative bust is set into a wall at the far end of a room through which guests will travel and to whom it is desired to impart special effects. Although preferably not noticeable by the guest, a perceived three-dimensional bust, depicting a person's head and face, are in reality part of the negative bust that is set into the wall. This bust, simply a mold formed from an original bust and having the same depth and features as the original bust, imparts the "gaze effect" that a perceived three-dimensional stone statuette turns to always face and look at each guest, no matter where they move within the narrow predefined field of view.

While the aforementioned special effects provided by negative busts are useful for their intended application, they have a narrow field of view, they do not typically realistically animate, they do not provide for the effect to extend beyond the negative relief, and they are not adaptable to different visages, and thus have a practical utility only where the desired character is predefined, static, the effect is restricted to the negative relief, and the field of view can be narrow.

With respect to the field of view, the gaze effect of the prior art busts has a limited effective viewing range. That is, due to their curvature, detailed features and depth, which model that of the original object, the special effects may only be viewed within a narrow angle 11, as illustrated in FIG. 1. As the viewer begins to move towards the periphery of the wedge-shaped viewing area, designated by the angle $2\theta$, the viewer perceives an edge 12 of the negative mold 15, and realizes that the effect is caused by a negative mold and not by an actual three-dimensional object. For example, the angle $2\theta$ of the HAUNTED MANSION TM bust is only fifty-five degrees, based upon a concave bust having dimensions and features corresponding to the head of an adult male human. A reverse bust novelty mask of a witch's face for Halloween made by Optic Images of Glendale, Calif. has been obtained and the gaze effect angle $2\theta$ was forty degrees. It is therefore an object of the present invention to provide a negative bust effect in which the viewing angle for the guests is as large as possible. It is also desired that the negative illusion realistically animate, and provide for the effect to extend beyond the negative relief. In addition, it is intended that the negative relief be adaptable to different visages. The current invention solves these problems, and provides further related advantages.

SUMMARY OF THE INVENTION

The present invention provides a negative bust illusion of an object that appears to follow a viewer within an angle of view, or a "gaze effect." Using the principles of the invention, a negative bust is configured to provide a visual effect which may be tailored within a range to provide a large viewing angle.

In accordance with the principles of the invention, the negative bust illusion may be implemented as a rigid shell that depicts a three-dimensional object having depth. The rigid shell has a generally concave side that defines the angle of viewing which is presented to the viewer as the viewer moves along a path. The depth of the bust is reduced (flattened) in at least certain portions to increase the width of the angle of viewing. Preferably, this depth may be chosen to be less than eighty percent of the depth of the object represented by the bust, with the width and height substantially the same as the object to provide the widest viewing angle without significant loss of the gaze effect. If it is desired that the bust be a scaled representation of the object, then the height, width and reduced depth should retain the same proportional relationship. The flattening of the negative bust relative to its original depth does increase the angle in which the gaze effect is experienced without creating the unacceptable visual distortion of the image expected to be perceived by the viewer in a range of about seventy degrees to about seventy-five degrees.

Using soft edges, the negative bust of the present invention can be further enhanced. The soft edges permit the gradual blending of the negative bust with additional visage for a visually accurate and believeable total image which extends the illusion beyond the region of the negative relief.

The present invention further provides a device and method of creating an illusion of an object that appears to follow a viewer within an angle of view, using a negative bust that represents a head, and an image printed, painted or otherwised imbued onto either surface of the bust. The image may contain detailed features and form shadows resulting in a static effect.

The present invention also provides a device and method of creating an illusion of an object that appears to follow a viewer within an angle of view, using a negative bust that represents a head, and a projector that is aligned to project an image corresponding to the head onto a convex side of the negative bust to impart appearance thereto. The negative bust is composed of a thin, translucent material, such that it has a convex side and a concave side, and possesses the property that projection can be made onto the convex side with a viewer of the concave side observing the projection, due to the diffusion of light through the material. The projector is positioned to project the image onto the convex side of the negative bust. The reduced negative relief is particularly adapted to having a projection thereupon because it is closer to a flat surface. Because the projection surface has less negative relief, the projection device can have a narrower depth of field and any distortions from projection onto oblique surfaces are minimized.

In the present invention, a viewing area is thus provided to the viewer that includes an area originating with the negative bust wherein the gaze effect is observed, no matter the viewer's position within the angle of view, and projecting the image to impart realistic appearance to the concave side of negative bust. Further, by minimizing the detail of the negative relief, the negative bust can be used for various animations and projections without loosing visual acuity. It should be remembered that the primary facial feature preferred for creating the illusion is a generic negative relief at the approximate location of the nose. In more particular forms of the invention, the projection may additionally provide animation or color, to further enhance the gaze effect.

DESCRIPTION OF THE DRAWINGS

FIG. 2B is a table that gives the effective total angle of viewing of a gaze effect created by three different negative bust arrangements, including two full curvature busts of the prior art and the preferred embodiment of the present invention.

FIG. 3 is an illustrative view of the negative bust, used in cooperation with a projector that projects onto the convex side of the negative bust to impart an illusion to viewers on the other, concave side of the bust.

FIG. 4 is an illustrative view of an alternative embodiment, which include a video camera, a computer, a color plotter, and vacuum-forming equipment, for printing static negative busts from a captured video image. This figure is also used to explain formation of the negative bust, which is also used in the preferred embodiment.

DETAILED DESCRIPTION

Figure 1:
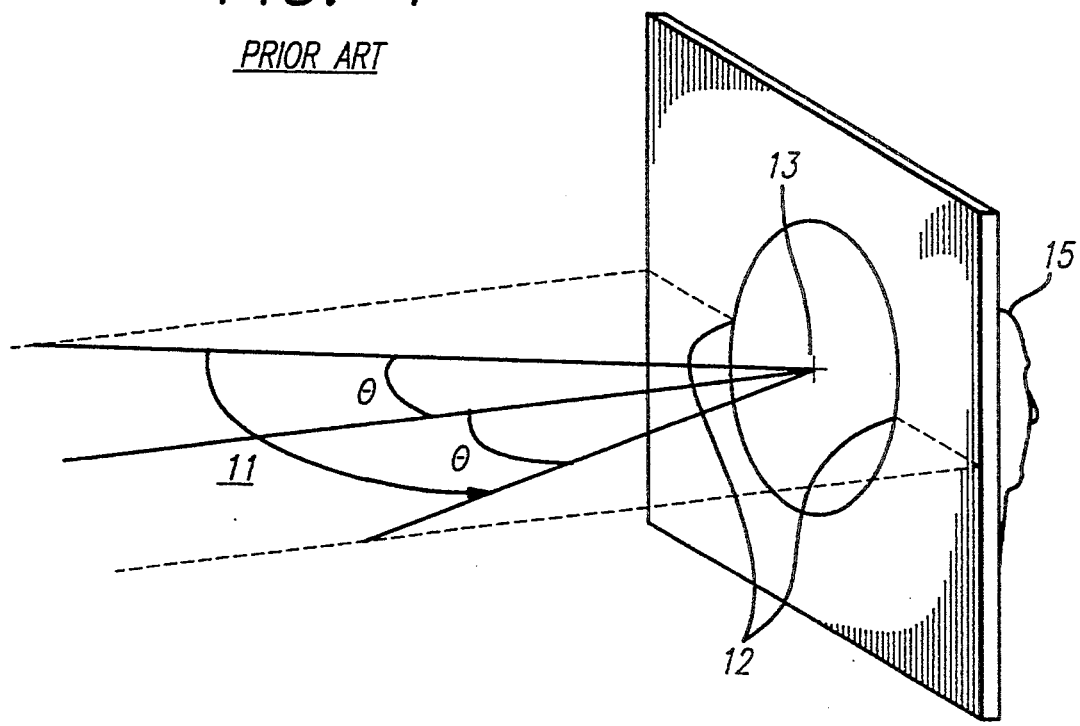
FIG. 1 is a perspective view of a negative bust of full curvature and detailed features, as used in the prior art to provide the illusion that the bust's gaze follows a viewer within an angle of viewing $2\theta$.

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of each of the negative bust illusion and the method which were summarized above and which are defined in the enumerated claims.

In accordance with the principles of the invention, the preferred embodiment is a negative bust illusion that provides a wide effective angle for an illusion, which may be animated, that may readily be selected to be any persona. As used in connection with the present invention, the term "negative bust" refers to any negative of a three-dimensional object, and is not limited to a negative human face, used in the preferred embodiment. Preferably, the negative bust is used to present an illusion in a theme park environment that a dimensional person is always gazing at them and/or facing them.

The negative bust is formed of a thin, light-diffusing rigid shell 17 that is ideally a styrene material that has been heat deformed to the basic shape of a human face, having much of the curvature and depth possessed thereby. While depth is necessary to the negative bust, to impart the illusion that the person represented by the bust is continuously gazing at a viewer, it has been found that it may be reduced, or flattened, to approximately fifty percent of the actual depth of the human face without an appreciable loss in the gaze effect. The effective viewing angle 19 of the gaze effect is thereby increased over the prior art viewing angle 11 of approximately fifty-five degrees (using the HAUNTED MANSION TM bust as a reference) to approximately seventy degrees. This increase in angle is not unlimited since, beyond a certain point, the relative flattening of the bust will create visual distortions perceptible to the viewer. However, the angle can extend up to 75 degrees before noticeable distortion adversely affects the viewing experience.

The negative bust illusion is enhanced by using a colorless negative bust which is formed of a thin, three-dimensionally-formed material that has only abstract facial features. A video projector 21, located behind the convex side 23 of the rigid shell 17 and preferrably beyond sight of viewers, is aligned to project a sequence of images from a video source 65 of a human face onto the convex side of the rigid shell. This projection imparts the details to the negative face to support the gaze effect, such as eyes, mouth, hair, skin color, form shadows, glasses, lipstick, etc., or other effects. The sequence of images creates animation, which to the viewers, makes the rigid shell 17 appear to move, talk and blink. With the aid of sound reproduction equipment 25 and transducers 67 and control over non-projection lighting (not shown), the bust effect is further enhanced.

The styrene material, which is preferably a Lambertian diffuser, presents this projected image through the concave side 33 of the material to the viewer, to whom the image appears animated and three-dimensional. In addition, the image may be projected in color, further contributing to the effect.

I. Formation Of The Negative Bust And Viewing Area

Figure 2A:
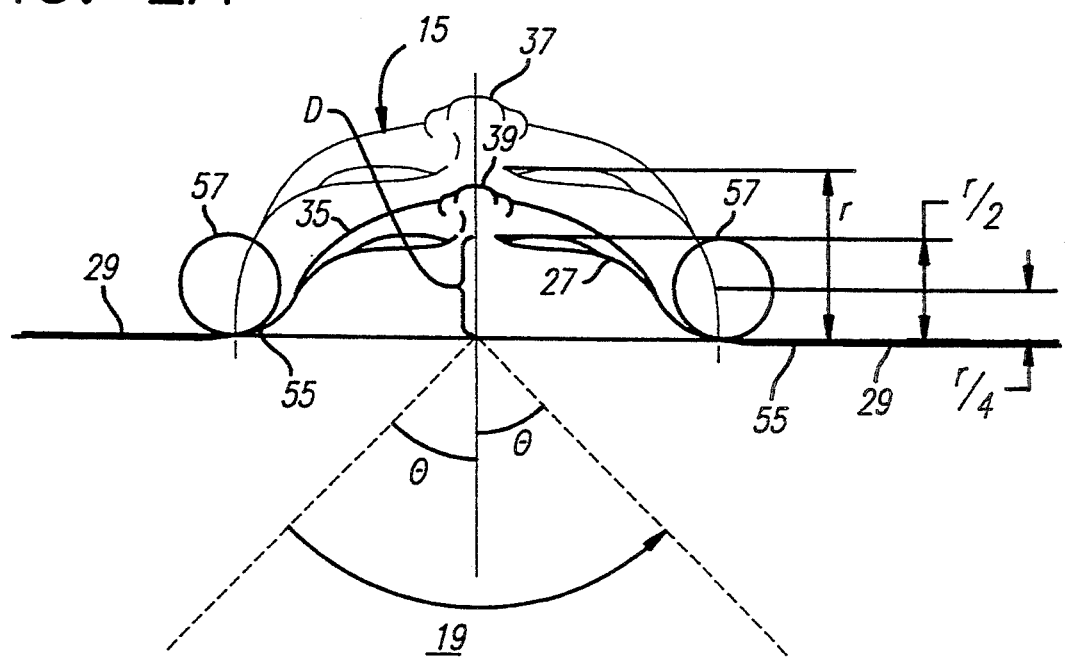
FIG. 2A is a plan view contrasting a negative bust of the present invention with the a full curvature bust of the prior art.

The rigid shell 17 that defines the negative bust is matched in shape to the human head, having a curved face portion 27 as shown in FIG. 2A, and a relief portion 29 that helps support visual features at the periphery of the human face, for example, hair. Preferably, the rigid shell 17 is composed of a thin styrene based material that may be easily deformed when heated and that easily diffuses light, and thus is useable as a three-dimensional projection surface. It has been found that a styrene sheet of approximately fifteen mils in thickness is suitable for use as a projection surface, and further, lends itself to the imbuement of printed images directly onto the styrene convex surface 23 or concave surface 33. As described below in connection with alternative embodiments, this printing process may be used with ordinary printers or plotters to provide a static negative bust. In the preferred embodiment, however, the rigid shell 17 is animated by projection to present a moving and talking bust, and therefore, the rigid shell is maintained as a white surface, without printing prior to deformation. Alternatively, a combination of the printing and projecting techniques may be used.

The approximately fifteen mils-thick styrene forming rigid shell 17 is especially useful for creating a negative bust illusion aided by rear projection, since it provides substantially realistic luminance regardless of the viewing angle (a so-called "Lambertian surface"). In other words, the image on the concave side 33 of the rigid shell appears just as bright to a viewer no matter where he or she stands. This is of significant importance in a theme park environment where the effect is to be presented to a large number of guests simultaneously and it is desired to make the illusion as uniform as possible over a wide viewing area.

Where it is desired to provide a wide effective angle of the gaze effect, as it is in the preferred, theme park implementation, the depth of the cavity that defines the negative bust is reduced to approximately fifty percent of normal, as shown in FIG. 2A. FIG. 2B illustrates the variance in the effective angle of view of the gaze effect as a function of normal depth of the rigid shell 17 within this range (50% to 100%). Importantly, it has been found that the gaze effect begins to break down if depth is reduced to less than fifty percent of its normal value. Thus, the depth is preferably maintained above fifty percent of the normal value. This also provides for improved diffusion of light during projection on the convex surface of the rigid shell, since the projection surface is generally less sloped relative to the full depth bust 15.

The front half of a human head is modelled in full size bust 15 in FIG. 2A as a semi-circle having a radius r, and possesses certain abstract features such as a nose portion 37, forehead (not shown), eye recesses (not shown), chin (not shown) and cheeks. The reduced depth model 35 has a reduced depth D which provides that a viewing angle of greater than 65 degrees results. For example, setting D as approximately ½ r provides an approximately seventy degree field of view, as contrasted with the more limited field of view of less than 55 degrees provided by a full depth bust 15.

The rigid shell 17 and its associated cavity that defines the head is, in the preferred embodiment, created by using a vacuum-formation process.

The negative bust used for the present invention is a simple form that resembles a shallow front portion of a human head and having reduced depth of about fifty percent of the human head. In FIG. 2A, a features are abstract in detail and define the nose, 39, etc., as well as a tapered transition region 55 that provides a smooth transition between the face portion 27 and relief portion 29 of the rigid shell 17. The more specific detail, i.e., as to hair, eyes, nose, eyebrow, skin color, ears, associated form shadows, etc., in the preferred embodiment, is added by projection of actual images of a human face by projection.

As illustrated in FIG. 2A, the edges of the rigid shell 17 and reduced depth model 35 are tapered to have a radius of curvature that is approximately one-quarter the radius of the circle upon which the human head is modelled. In other words, the curvature of the tapered transitions regions 55 between the face portion 27 and the relief portion 29 are relatively constant about a radius of ¼ r, as illustrated by the circles designated by the reference numeral 57 in FIG. 2A. Ideally, the transition regions 55 should be located, vis-a-vis the visual image projected onto the bust, at approximately the hairline.

As shown in FIG. 3, the rigid shell 17 is mounted in a manner such that its concave side 33 faces the viewing area that guests will occupy. The room is configured in such a manner that the guests will not view the projector 21, which is aligned to project onto the convex side 23 of the rigid shell 17. As shown in FIG. 3, a wall 59 is provided for this purpose and readily conceals the projector 21 and convex side 23 of the rigid shell from the viewer.

II. Presenting An Animated Effect

A video camera 61 may be used to capture an audio-visual representation, which can be color, of a living person 63, for subsequent projection onto the convex side 23 of the rigid shell 17. A computer graphic or a hand drawn cartoon image or image sequence may be used instead of one captured of the person. As seen in FIG. 3, the projector 21 is preferably a projector that accepts standard NTSC video signals. An example of such a projector is model no. "XV100P" liquid crystal projector made by Sharp Electronics Corporation, Professional Products Division of Mahwah, N.J. The projector 21 receives video signals from the video source 65 which is preferably a video disc player. The video source 65 may also provide audio signals to audio equipment 25 which drives transducers 67 in synchronism with the projected video image.

The projector 21 generates a sequence of electronic images of a person's face that will be projected onto the negative bust to aid the gaze effect. In particular, the projector 21 will generate a sequence of images that preferably are limited to a front-on view of the person's face 69 (the "desired image"). During a filming session, the person will read from a script and generate facial expressions such as blinking of the eyes and the like, while facing straight ahead toward the camera.

In the preferred implementation, where the negative bust illusion is part of a permanent attraction, the image of the person's face is captured to form a permanent record that will be used repeatedly to present the same effect to each group of viewers that passes. To this end, the video image preferably is of short duration and is played as a continuous loop (not shown). For most effects, the projected image will include the person's face only, or is taken against a background matte which may be removed in well known manner. Additionally, if it is desired to present special effects, such as horror effects, an image processor 73 having graphics software may be used to process the electronic video signal of the image, an alternatively, may be used to generate an image from scratch.

The projector and projected media should be capable of scaling the images to match dimensions of the cavity that defines the negative bust. The images can be further enhanced by providing for the capability of modifying the captured images through color correction or field manipulation, for example, adding a moustache, changing hair color, or altering the shape of the face, i.e., nose position, length of the face, etc. With these features, the optional image processing element should be capable of performing any desired image manipulation, or adding special effects.

Whether or not an image processor is used to modify the captured image, the image needs to be sized to the face portion by known methods. In this manner, the nose 39, eye recesses and other features of the negative bust may be precisely aligned and scaled to the projected image, and the person's hair (as displayed by the projected image), made to fall at the transition regions 55 of the negative bust. Alternatively, the spatial relationship between the projector and the rigid shell 17 may be varied to generally but imprecisely align the projected image with the negative bust and its features. Projection optics may be further used to focus and zoom the image. Finally, the captured image may be modified using sophisticated video processing equipment, such as an image processing graphics computer and software, to stretch and distort the captured image to match the cavity of the rigid shell 17. In the preferred embodiment, since only general facial features of the person are imbued in the negative bust, it suffices merely to scale the captured video image such that it aligns with the general features of the negative bust.

Using a thin Lambertian diffuser, as described, the captured image is projected onto the convex side 23 of the rigid shell 17. To a viewer of its concave side 33, the bust will appear to be a three-dimensional person having a gaze that looks at the viewer no matter where he stands and no matter how he moves, whether forward, backward, upward, downward or from side-to-side. To enhance this effect, other lighting on the concave side 33 is minimized, which might otherwise inform the viewer that the image is a negative bust, and not a positive, three-dimensional object, or which might otherwise detract from the effect.

III. A Static Negative Bust Configured To Bear A Captured Image

The present invention can be used in an amusement park environment to create static negative busts for the amusement of guests attending the park, and for sale as a novelty item. These static negative busts may be enhanced by appropriate color, features and form shadows printed, painted or otherwise imbued on the form. Alternatively, these busts may be used for a static gaze effect. For example, a mask of a known celebrity or the guest himself could be printed using standard silk screen and vacuum forming processes.

As shown in FIG. 4, to make the negative bust with the guest's face upon it, the camera 61 is used to take pictures of the person 63, and to generate and automatically size a printer image which is printed onto sheets of the styrene material 49. The styrene material 49 is then heated by heater 51, then deformed by the vacuum-forming device 47 to produce a rigid shell 79 that depicts a static, negative bust, which bears a full color, photographic likeness of the person 63 whose image was captured by the camera 61. In a variant upon this implementation, the image processor 71 may be employed without a camera, and the guests provided with a computer graphics interface (not shown) to enable them to custom design facial features, or other art work, that will be imbued in the completed, static negative busts.

A hand-held S.L.R. ("single lens reflex") digital camera (in place of the video camera of the preferred embodiment 61) is used to generate a single frame image, which includes a facial image. In particular, a "PROFESSIONAL DCS 200 DIGITAL CAMERA," available from the Eastman Kodak Company of Rochester, N.Y., is utilized for this purpose. This digital camera features camera with a conventional lens assembly, i.e., wide-angle lens, normal lens, telescope zoom. The image is shuttered, as with more conventional S.L.R. cameras, except that the image falls upon an array of light sensing (charge-coupled) devices, contained within the camera, that digitize the captured image. This image is stored on a random access memory of the camera, much as an visual image can be stored in the memory of today's modern digital computers. As the picture is taken, or alternatively when the camera's random access memory is full (with a plurality of images), the captured image data may be downloaded to the image processor 71 (a "INDIGO ELAN" computer 73 from Silicon Graphics, Inc. of Mountain View, Calif.) and processed and printed, as described further below. In fact, the digital camera may be obtained in several formats, including black-and-white or color, and with or without an internal hard disk, which stores up to fifty images in digital RGB format, described below. A SCSI ("small computer standard interface") parallel coupling 81 couples the camera to an external port 75 of the computer 73, and is used for this downloading procedure. Preferably then, the digital camera does not have an internal hard disk, but is directly coupled to the image processor so that each image may be selective printed as it is shot.

Currently, software drivers for the "PROFESSIONAL DCS 200 DIGITAL CAMERA" are available from the Eastman Kodak Company of Rochester, N.Y. for the MACINTOSH and IBM format computers. It is believed that an appropriate software driver for the "INDIGO ELAN" computer 73 either is, or shortly will be, available from the Eastman Kodak Company. The purpose and function of the driver is to command the computer to retrieve the captured image data from the digital camera and to appropriately format and store that data in a file in memory of the computer. This data may then be loaded to a plotter 83, which prints the person's image onto a sheet of flat, heat-settable, deformable material.

The computer 73 is coupled by a SCSI coupling 85 to a standard printing device, which may be any device which is conventionally used to print text or illustrations, including computer printers and plotters. In this particular embodiment, a large-size ink jet table plotter 83 is used which has the capability of printing in one of several colors. Alternatively, other types of printers or plotters may also be used which are capable of accepting and printing upon the styrene material, including a laser printer. If a typical laser printer is used (such as a "LASERJET" printer, available from Hewlett-Packard, Inc.), the styrene material used is, as mentioned above, approximately 15 mils in thickness, which is sufficiently thin for proper transport in the paper transport mechanisms in most printers, yet sufficiently thick to stretch without undue tear or distortion during deformation of the material.

Unlike the conventional arrangement, where a plotter or printer is used to print computer graphics and illustrations on ordinary paper, this alternative embodiment prints on flat, thin sheets of a styrene based material 49. The ink from the plotter 83 is absorbed into the surface of the styrene based material 49 and retained throughout the heat deformation process. Importantly, most commonly used inks have a very high temperature breakdown, and accordingly, the styrene material 49 is heated to a temperature which is sufficient to allow the material's deformation, but which will not result in heat breakdown of the color ink. The deformation process will itself deform the printed image to a controlled and intended extent, due to the stretching of the styrene material 49 over a die 45. However, the printed ink will not break down at the deformation temperature, and distortion of the printed image will be occasioned solely by the stretching of the material 49 as long as the deformation temperature is maintained below the breakdown temperature of the color ink. It has been found that most common inks have a breakdown temperature of approximately 300 to 350 degrees fahrenheit, while a temperature of 200 to 250 degrees fahrenheit is suitable for deformation. As an alternative to styrene, other material may be utilized which has the properties that it is rigid or semi-rigid at room temperature, capable of being softened, deformed and set to retain a three-dimensional shape, and capable of retaining ink through a the deformation process.

Once the plotter 83 has finished printing upon styrene material 49, the styrene material 49 is advanced by a feeder to the vacuum-forming device 47, which deforms the printed styrene material 49 into the rigid shell 79. Importantly, the printed side of the styrene 87 is oriented to face the die during deformation, such that the printed image appears on the concave side 89 of the distorted styrene. As a final step, a cutter 53 separates the rigid shell 79 from the surrounding waste material. Control of the die-forming, cutting, and transport mechanisms of this machine are preferably synchronized by the computer 73, in this alternative embodiment. The steps performed by the vacuum-forming device 47 are as discussed above, in connected with the preferred embodiment.

The stretching of the flat, styrene material 49 over the die 45 accurately recreates the likeness of the face, upon the printed side of the styrene material 87 of the rigid shell 79, of the person 63 who served as the model for the negative bust. Importantly, the un-deformed styrene after it has been imbued with the printer image shows only a two-dimensional likeness of the person's face 69. For example, the person's temples are not accurately represented in the two-dimensional likeness. However, when the material is stretched over the die 45, the two-dimensional temples are stretched to visually appear at near-normal dimensions. Similarly, the two-dimensional depictions of nose, eyes and chin are realistically distorted by the deformation of the styrene material with the die 45 to give the illusion of a three-dimensional form.

Thus, a static negative bust bearing an actual person's likeness may be created in real time from an electronic photograph. This static negative bust, as with the preferred embodiment, possesses the characteristic that its gaze appears to follow any onlooker within approximately a seventy degree angle of view on the concave side 89 of the rigid shell 79.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

We claim:

1. An apparatus for providing the illusion that a bust of a face portion of a head continues to gaze upon a viewer who moves past the head in a path extending through an angle originating at the bust, said apparatus comprising:

a rigid shell framed by a horizontal and vertical framing plane, said rigid shell defining a cavity extending into a depth direction perpendicular to said plane away from the viewer, said cavity shaped to define a negative, three dimensional contour of the face portion of the head;

wherein said shell is composed of a thin, at least partially translucent material that is a rear projection surface, such that images projected upon a convex side of said cavity are visible to the viewer, who views a concave side facing the predetermined path; and, a projection device that projects images upon said convex side.

2. An apparatus according to claim 1, wherein said rigid shell is formed by inelastically deforming a flat, deformable, heat-settable material with a deformation device while said material is warmed, and by subsequently cooling said material such that it retains its form.

3. An apparatus according to claim 1, wherein said thin, at least partially translucent material is a Lambertian diffuser.

4. An apparatus according to claim 1 wherein said projection device projects a plurality of images of a face that are scaled, and that have facial features that are aligned with and that correspond to said bust, such that said projection device projects animation by projection onto said bust to impart the illusion that the bust is animated.

5. An apparatus according to claim 1, wherein:

said rigid shell further includes a planar relief portion within said framing plane that defines the boundaries of a head portion that depicts said head, said head portion having a tapered transition region to said relief portion having a radius curvature; and, said images of an animated face are scaled and aligned to place hair and ears of said animated face at approximately said tapered transition region.

6. An apparatus intended to provide the illusion that a bust of a face portion of a head with at least two eyes continues to gaze upon a viewer of the head who moves past the head in a predetermined path extending through an angle $2\cdot\theta$ originating at the bust, said apparatus comprising:

a rigid shell framed by a horizontal and vertical framing plane, said rigid shell defining a cavity extending into a depth direction perpendicular to said plane away from the viewer, said cavity shaped to define a negative, three dimensional contour of the face portion of the head having two eyes and a region between them, the head having a maximum width $2\cdot r$ in a horizontal plane passing through said region and a maximum depth D in the same horizontal plane between said region and the framing plane, said cavity having a ratio of depth-to-width (D/r) selected to provide and effective viewing angle 2·θ which exceeds fifty-five degrees.

7. An apparatus according to claim 6, wherein said ratio is selected to be less than four-tenths.

8. An apparatus according to claim 7, wherein said ratio is selected to be approximately one-quarter.

9. An apparatus according to claim 6, wherein said rigid shell is formed of a flat, plastic material that is inelastically deformed with a deformation device against a die having only abstract facial features.

10. An apparatus according to claim 9, wherein the plastic material is a styrene material.

11. An apparatus according to claim 9, wherein said rigid shell further includes a visual image captured by a camera which is printed onto said flat, plastic material prior to deformation.

12. An apparatus intended to provide the illusion that a bust of a face portion of a head with at least two eyes continues to gaze upon a viewer of the head who moves past the head in a predetermined path extending through an angle 2·θ originating at the bust, said apparatus comprising:

a rigid shell framed by a horizontal and vertical framing plane, said rigid shell defining a cavity extending into a depth direction perpendicular to said plane away from the viewer, said cavity shaped to define a negative, three dimensional contour of the face portion of the head;

wherein said shell is composed of a thin, at least partially translucent material that is a rear projection surface, such that images projected upon a convex side of said cavity are visible to the viewer, who views a concave side facing the predetermined path; and, a projection device that projects images upon said convex side including images of the two eyes.

13. An apparatus according to claim 12, wherein said cavity defines the head to have a maximum width 2·r in horizontal plane passing through said region and a maximum depth D in the same horizontal plane between said region and the framing plane, said cavity having a ratio of depth-to-width (D/r) selected to provide and effective viewing angle 2·θ which exceeds forty degrees.

14. An apparatus according to claim 12, wherein said thin, at least partially translucent material is a Lambertian surface.

15. An apparatus according to claim 12, wherein said projection device projects a plurality of images of a face that are scaled, and that have facial features that are aligned with and that correspond to said bust, such that said projection device projects animation by projection onto said bust to thereby enhance the illusion.

16. A method of creating an illusion using a bust of a face portion of a head with at least two eyes that continues to gaze upon a viewer of the head who moves past the head in a predetermined path extending through an angle 2·θ originating at the bust, the bust formed of rigid shell framed by a horizontal and vertical framing plane, said rigid shell defining a cavity extending into a depth direction perpendicular to said plane away from the viewer, said cavity shaped to define a negative, three dimensional contour of the face portion of the head, the shell having a concave side of the cavity and a convex side and being composed of a material that is at least partially translucent, and a projection device that is aligned to project an image corresponding to the object onto the convex side to impart additional appearance thereto, including images of the eyes, the method comprising the steps of:

positioning the projector to project the image onto the convex side of the rigid shell such that the images of the eyes, when projected, are aligned on the rigid shell to impart the illusion that the eyes continue to gaze upon a viewer of the head who moves past the head along the predetermined path;

providing a viewing area to the viewer on the concave side only of the rigid shell, the viewing area including the predetermined path and falling within the angle 2·θ that originates at the bust, wherein the viewer is free to move along the predetermined path through the viewing area such that the illusion is presented throughout the viewer's movement through the viewing area; and projecting the image upon the convex side to impart the additional appearance to the negative bust on the concave side of the rigid shell and to thereby contribute to the creation of the illusion.

17. A method according to claim 16, wherein the rigid shell defines a negative impression of the front portion of a head having abstract features including a negative nose, the image having facial features including a mouth, the method further comprising the step of aligning the projection such that facial features of the image are projected onto the convex side of the rigid shell in corresponding alignment with the abstract features.

18. A method according to claim 17, wherein sound equipment is utilized to present sounds to the viewer that correspond to the projection, the method further comprising the steps of:

projecting the mouth adjacent to and below the negative nose;

projecting a sequence of images such that the mouth appears to talk; and, sequencing the presentation of sounds by the audio equipment to provide talking sounds that match the talking actions of the projected sequence of images.

19. A method according to claim 16, wherein the method further includes the step of projecting a sequence of related images onto the convex side of the negative bust to impart animation thereto.

20. A method according to claim 16, wherein a camera is further used, the method further comprising the steps of:

capturing a visual representation of a person's face with the camera;

providing the captured visual representation to the projector in an electronic signal format whereby the projector can project the image onto the convex side of the rigid shell;

aligning and projecting the captured visual representation onto the convex side of the negative bust.

21. A method according to claim 20, wherein the rigid shell includes a face portion that is generally the shape of a human face and that represents abstract features, such as nose and chin, the method further comprising the step of projecting the captured visual representation onto the abstract features in alignment therewith such that the rigid shell serves as a nonspecific convex projection surface for the projection of a plurality of different human faces imaged by the camera.

22. A method of creating an illusion using a bust of a face portion of a head with at least two eyes that continues to gaze upon a viewer of the head who moves past the head in a predetermined path extending through an angle 2·θ originating at the bust, the bust formed of rigid shell framed by a horizontal and vertical framing plane, said rigid shell defining a cavity extending into a depth direction perpendicular to said plane away from the viewer, said cavity shaped to define a negative, three dimensional contour of the face portion of the head including the eyes and a region between them, the shell having a concave side of the cavity and a convex side and being composed of a material that is at least partially translucent, a projection device that is aligned to project images corresponding to the object onto the convex side to impart additional appearance thereto, including images of a mouth that is animated to present talking actions, and sound equipment that is utilized to present sounds to the viewer that correspond to the projection, the method comprising the steps of:

- positioning the projector to project the image onto the convex side of the rigid shell such that the images of the animated mouth, when projected, are aligned on the rigid shell immediately below the region between the eyes to impart the illusion that the face portion continues to face a viewer of the head who moves past the head along the predetermined path, and that the head is speaking to the viewer;
- providing a viewing area to the viewer on the concave side only of the rigid shell, the viewing area including the predetermined path and falling within the angle 2·θ that originates at the bust, wherein the viewer is free to move along the predetermined path through the viewing area such that the illusion is presented throughout the viewer's movement through the viewing area;
- projecting the images upon the convex side to impart the additional appearance to the negative bust on the concave side of the rigid shell and to thereby contribute to the creation of the illusion; and
- sequencing the presentation of sounds by the audio equipment with the projection of images of the mouth to provide talking sounds that match talking actions of the projected images.

* * * * *